Patented Nov. 29, 1938

2,138,795

UNITED STATES PATENT OFFICE 2,138,795

COMPOSITION SUITABLE FOR DENTURES AND PROCESS OF PREPARING SAME

John H. Schmidt, Bloomfield, N. J., assignor to Bakelite Corporation, New York, N. Y., a corporation of Delaware No Drawing. Application October 30, 1934, Serial No. 750,671

11 Claims. (Cl. 260—4)

This invention relates in its specific application to dentures and compositions suitable for their manufacture. It has application, however, to other equivalent articles and their manufacture.

In order for a denture to be satisfactory a number of conditions should be met. Among these are a natural appearance, permanency of color, accurate and unchanging fit, resistance to mouth fluids, hardness without brittleness and toughness without softness. From the standpoint of denture manufacture the technic should be simple, the composition should be such as to securely enclose the porcelain or metal teeth or other inserts, and it should be possible to repair the denture in case of breakage; to meet such conditions it is necessary that the composition used be one readily molded to shape, and one that will not shrink upon setting to its permanent form.

One of the commonest materials used for dentures is hard rubber. Rubber, however, has a number of objections; its lack of translucency makes it lifeless and unattractive in appearance, and it is unsanitary and difficult to keep clean. Porcelain, which is used primarily to obtain translucency, is difficult to manipulate and the denture is too brittle for ordinary usage. Pyroxylin compounds are found unsanitary and the taste is objectionable. The industry has accordingly turned to synthetic resins and particularly to those heat-hardening resins obtained by the condensation of phenols with aldehydes; but as pointed out in the patent to Roberts No. 1,825,286, September 29, 1931, with phenol-aldehyde resins as heretofore prepared "it is difficult to secure a uniform cure, the color shade is not permanent, especially in making a second cure on repairs, and the shattering strength of the material is relatively low". The reasons underlying such a conclusion become apparent when the normal practice followed in preparing heat-hardening resins is considered in more detail.

There are two customary and distinctive processes followed in preparing heat-hardening resins from a phenol and formaldehyde (or its equivalent). According to one, known as the one-step process, a condensation is caused between them in substantially molecular proportions, and for this purpose an alkaline catalyst is practically required; acid catalysts with such proportions tend to produce novo!aks or non-heat-hardening resins, and if the amount of formaldehyde is increased to overcome this tendency, the reaction is not readily controlled. On the other hand when a basic catalyst is used, an amount of formaldehyde equal to or in excess of molecular proportions imposes difficulties, for during a subsequent dehydration the resin reaction continues and is apt to result in a gelation or precipitation of a rubbery non-serviceable product. The other process known as the two-step process accordingly is preferred and generally followed, in which process phenol is present in excess of molecular proportions to yield a novolak or non-heat-hardening product; this product can be dehydrated without any danger of becoming rubbery, but to make it reactive or heat-hardenable it then becomes necessary to add a hardening agent such as hexamethylenetetramine. A heat-reactive two-step product, however, cannot as such, be used for molding dentures, for it is so fusible that it will flow from the mold or flask of the type used in denture manufacture upon heating. This condition can be remedied by a preliminary partial heating of the resin to a plastic solid before it is charged into a mold, but the degree of advancement or hardening is difficult to control and on storage the hardening action is apt to continue at room temperature until a non-moldable resin results, thus accounting for the lack of uniform cure and low shock resistance. In addition resins generally made with basis have a decided color imparted to them and tend to darken upon aging or upon exposure to air. Accordingly resins as normally prepared by either method are not practicable for denture manufacture, and they have associated with them the disadvantages noted in the aforementioned patent.

A prime requisite of compositions for denture manufacture is practically easy moldability so that the denture may be given the proper conformation. In the practice customarily followed a wax denture with porcelain teeth embedded therein is prepared, and from this is made a two part investment or mold of plaster of Paris with the body portions of the teeth secured in one section and the roof portions of the teeth and the wax denture in the other section; the wax is thereupon melted out leaving the mold cavity. The mold is then charged with the denture composition which must become sufficiently plastic upon heating so as to fill the mold and yet be in a sufficiently solid condition that it will not soften to the extent of flowing out of the mold. After the mold is thus charged and the sections clamped together, the mold is normally placed within a pressure chamber and subjected to the molding temperature (about 135° C.) required by the composition, the pressure within the chamber is customarily but slightly above atmospheric, say 2 to 10 pounds per square inch. In this operation a heat-hardening resinous composition first softens so as to conform to the mold cavity and enclose the roots of the teeth; this is followed by a setting under the action of suitable heat to a hard rigid structure. If the resinous material is too stiff (that is, of insufficient plasticity) it will not have sufficient flow under the applic. heat and pressure to properly enclose the porcelain or metal inserts; a material that is too stiff also necessarily involves the disadvantage of requiring an increase in pressure which is undesirable as it is apt to cause breakage of the plaster mold or the porcelain teeth. On the other hand, if the resin is too soft (that is, of too great plasticity it will have too great a flow, so that the finished denture may exhibit bubbles or air pockets resulting from insufficient resistance.

A further requisite in a moldable denture composition is substantial freedom from shrinkage during the period in which the composition sets or cools to its final form. In the setting of the composition if there is material shrinkage stresses are induced which may be sufficient to cause breakage of the teeth inserted in the composition. Furthermore shrinkage of the composition results in a departure from the original model and therefore in a poor fitting denture.

Evidently a natural appearance is most desirable in an artificial denture. To this end it is essential that the product possess some translucency, and it is because of this property that porcelain in spite of all the difficulties of manipulation that it entails and other decided disadvantages has been regarded hitherto as the sine qua non in the denture industry. But such translucency excludes the presence of opaque-forming fillers, such as fibers or ground inorganic materials, which are generally and necessarily included with resins to give a pressure-moldable plastic composition having the desired flow in a mold and yet not run out of the mold (see a paper by Lebach in the Journal of the Society of Chemical Industry No. 11 Vol. XXXII, June 16, 1913, page 561, last two paragraphs); heavy pressures of 1000 pounds or more per square inch are usually required to obtain the desired flow. The avoidance of fillers that impart opacity to give a moldable product can be accomplished by carrying the resin-forming reaction mass to a stage of a pliable solid, but at this stage the usual resin reaction mass tends to advance in hardness or "cure" automatically at room temperatures with the disadvantage among others that it is thus devoid of "shelf life" necessary in a denture composition.

From the viewpoint of the finished denture, color permanence is perhaps as important a property as any other. This property is also involved in the question of denture repair, for obviously an old denture cannot be repaired without detection unless the repair material be of the same color as that of the denture. Then again for continued use the denture must have an extremely low water absorption ratio and not be affected by mouth fluids whether acid or alkaline. Hardness without brittleness and toughness without softness are essentials in resisting abradants and suddenly imposed shocks.

In one aspect of the present invention a process of preparing a heat-hardening resin from a phenol and formaldehyde or its equivalent is provided that is distinctively different from the one and two step processes heretofore described. Among the essentials that differentiate it are the ratio of an amount of formaldehyde or equivalent methylene containing body to a phenol that is largely in excess of molecular proportions, at least 1.5 mols and preferably a minimum of 2 mols of formaldehyde or equivalent to 1 mol of phenol, and their initial reaction in the presence of water and an alkaline catalyst, reacted under conditions to cause combination of substantially all of the formaldehyde with the phenol. Normally such an association of material excess of formaldehyde and a basic catalyst leads to difficulties in obtaining a usable heat-hardening resin for dental purposes. But these it is found can be avoided by operating the reaction so as to retard addition polymerization or gelation without interfering with a completion of the reaction of the phenol with substantially the total amount of formaldehyde included, and to dehydrate the mass without resin separation by driving off the water under conditions which likewise do not cause objectionable advancement or gelling of the resinous mass.

In the preparation of a phenol-aldehyde resin suitable for molding into dentures, the ratio of at least 1.5 mols of formaldehyde or equivalent methylene containing body with each mol of phenol appears critical, for instance, in meeting the requirement of color permanency; to this end a further condition is the combination of substantially all the formaldehyde with the phenol. One mol formaldehyde readily reacts with one of phenol under basic conditions; but the linking of another molecule of formaldehyde with the phenol molecule imposes the problem to the solution of which the present invention is directed. To account for the surprising property of color stability thus obtained it is believed that a second substitution takes place in the para position on the phenol ring, and by this substitution a molecular rearrangement to a quinone form containing a chromophore group is prevented.

The conditions under which the reaction is performed, and by which substantially the whole of the formaldehyde content is combined and retained in the resin without causing undue advancement of or gelation of the resin, involves continuing the initial reaction under basic conditions sufficiently long to properly direct the reaction. When this stage is reached the reactivity is arrested and the mass dehydrated; this can be accomplished in different ways. According to one method the reactivity is reduced to the desired extent by acidifying and the mass is afterwards dehydrated; acid is preferably added to an extent that the mass exhibits a slight acid reaction. According to a second method the mass is first dehydrated under a change in operating conditions sufficient to arrest the reaction, for instance a sudden drop in the temperature caused by the application of a vacuum, and thereafter neutralized and acidified.

In the step of acidification it is preferable to carry this slightly beyond neutralization, as the mass is found to exhibit a lower reactivity. It is also found desirable that the acid used be one that will form an insoluble salt with the basic catalyst; neutralization thereby removes the base from the reaction zone and it also is found to contribute advantages to the molded product. For neutralization a strong acid accordingly can be used, but for acidification beyond the neutral point a weak acid, such as phosphoric acid or an organic acid as lactic or oxalic, is preferred as affording a better means of control. Where both strong and weak acids are used, they can be added together in proper proportions for the strong acid to effect neutralization and the weak acid to supply the desired condition of acidity.

Whichever method is followed it is found to be essential to avoid release of formaldehyde and loss of resin as hereinafter explained that the water be driven off by heat without any removal of resinous products. After the resinous mass has been acidified and dehydrated, or dehydrated and then acidified, it is then advanced by heating in air to the desired plastic solid state, that is, to a non-melting solid softening or yielding at molding temperatures under applied pressure of substantially zero or up to 50 or more pounds per square inch. During this final heating step some additional water which is apparently the result of resinification of the reaction mass along with free phenol and other volatile constituents is driven off.

By operating in this manner substantially all the formaldehyde is retained in the reaction mass and is forced into combination. This is insured in part by carrying out the initial heating under a reflux which returns the formaldehyde vapor to the mass to react therewith, and in part by dehydration which causes concentration of the formaldehyde and consequent condensation without resin segregation. Under the conditions described the trend of the reaction is toward the formation of polyalcohols, as the excess formaldehyde contributes additional groups which attach themselves to the phenol ring. Having the excess formaldehyde thus linked to the phenol ring and dehydrating by evaporation without segregation yield a product that in a neutral or preferably slightly acid condition does not change materially over a reasonable period of time at normal room temperatures but which is hardenable under the action of heat at elevated temperatures.

When a ratio of at least 1½ mols of formaldehyde or equivalent methylene containing body and particularly 2 or more mols is maintained to each mol of phenol under the conditions stated so that substantially all the formaldehyde is combined, the resinous product formed at this stage is apparently a mixture of water soluble and insoluble constituents. If resin be precipitated and water be decanted off, a large part of the resin remains in and is removed with the water. Accordingly it is highly important from the standpoint of yield that there be no resin removal; but this is also found important from the standpoint of resin properties, and found to be particularly true with regard to permanence of color or freedom from color change. In other words separation of resin from the water by precipitation and decantation results in removal of a resinous constituent which has a surprising effect on color stability.

In order that the invention may be clearly comprehended the following examples relating specifically to the manufacture of resins suitable for dentures are included. It is to be understood, however, that the invention is not restricted to the ingredients, proportions or procedure specified, and that the ratio of 1½ mols of formaldehyde or equivalent methylene containing body to each mol of phenol may be maintained either by initially combining the ingredients in this ratio or by starting with an excess of either ingredient, and then by removing the excess of either through distillation or other suitable means arrive at this ratio in the final reaction product.

*Example 1.*—To about 560 grams of phenol is added about 700 grams of a forty per cent solution of commercial formaldehyde (that is, about 1 mol of phenol to 1.5 mols of formaldehyde) and 5 grams of sodium carbonate or other suitable basic substance, is included as a condensing agent. The mixture is caused to react by heating under a reflux for about an hour or longer, but the heating is stopped short of the gelation stage; during this period formaldehyde vapor is returned to the mass so that it is gradually forced into combination with the phenol. It is then acidified by the addition of about 15 grams of a suitable organic acid which effectively slows up the hardening reaction to such an extent that the water content can be substantially removed and at the same time a color-free product is obtained. Suitable dyes or pigments to give the desired tint can be included at this time, and the mixture can be dehydrated by boiling in an open vessel until the temperature reaches about 125 or 130° C. The resin material remaining in the vessel is poured upon a flat surface to cool.

In the process of acidification prior to dehydration, acids generally are not equivalents in that the results obtained vary with the acids used. For example, an active mineral acid, such as hydrochloric, advances the rate of resin formation to such a degree that the dehydration required for translucency is not practical; and the contained water particles give a milky, opaque product. On the other hand, while organic acids generally have the effect of a hardening action sufficiently slow so that substantial dehydration can be effected, the reaction proceeds with a mild organic acid as lactic acid at such a slow rate that reacted resin appears in the form of minute discrete particles in a medium or matrix of non-reacted or less reacted resin, yielding a milky and somewhat opaque appearance to the product. The selection of more active organic acid, such as oxalic, however, speeds the hardening reaction to an extent that reacted resin particles appear to be of a greatly increased size with the result that their translucency is imparted to the product. Therefore, while organic acids generally are suitable insofar as subsequent dehydration is concerned, I prefer to use the more active organic acids and specifically oxalic acid in the proportion stated.

While in the above recited procedure all the formaldehyde content is added at the beginning, a portion above 1.5 mols can be omitted and added later during the dehydration; in this case, the portion added is preferably in an anhydrous form, such as paraformaldehyde, and mixed in at the end of the dehydration step to react with, or remain in the material and not be carried off with the aqueous vapor. Preferably also in this case, the proportion of formaldehyde present in the initial reaction is at least that required to give a heat-hardening product with properties here indicated.

The procedure outlined can be varied. For example, the refluxing period can be lengthened and up to the point of gelation, for the longer this step is carried on with a basic condensing agent, the required amount of formaldehyde being present, the tougher and further advanced or hardened is the final product obtained. The period of about an hour or an hour and a quarter, however, results in a product, when substantially atmoshperic pressure is applied, in which the condensation is substantially complete. The final dehydration temperature is likewise subject to wide variation; but as substantially complete freedom from water is necessary for translucency, it is preferable to carry the temperature to that indicated if dehydrated at atmospheric pressure.

Compositions made in this manner with an organic acid agent present during the dehydration are plastic and substantially free from inherent color. The excess formaldehyde content imparts substantial permanence and stability of color and the initial reaction with a basic catalyst insures the resinoid formation with the degree of hardness or plasticity that may be found desirable in the dehydrated product. The compositions are furthermore characterized by a retention of their plastic condition for a long period; when made in accordance with the above disclosure, samples have shown a shelf life of 3 to 6 months and longer at ordinary room temperature being plastic enough at the end of that period to be readily manipulated and packed into a mold and yet advanced enough to be without any danger of running upon heating of the mold.

In the manufacture of dentures from the composition of Example 1 the procedure that is customary in the handling of rubber is followed. Strips of material of suitable size are cut and a plaster of Paris denture mold is packed with the strips. The mold is clamped in a closed position, baked for about one hour and preferably under a chamber pressure of about 35 pounds per square inch at a temperature of about 135° C.; after cooling the denture is removed. A hard translucent and strong product having permanence or stability of color and eminently suited for denture use is thus obtained.

Example II.—In the preferred form of the invention, 100 parts by weight of phenol and 200 parts by weight of formaldehyde (40% water solution) are reacted in the presence of about 2.5 parts of barium hydroxide under a reflux for about 30 minutes. A vacuum of about 29 inches is then applied which immediately lowers the temperature to the boiling point of water which at the reduced pressure is about 30° C. Dehydration under vacuum and heating is continued until the temperature of the resin solution rises to about 50° C. At these temperatures of dehydration there is no substantial advancement or polymerization of the resin; there may be however, progressive condensation (depending on the length of initial reflux period) due to concentration of remaining unreacted formaldehyde. The reaction is then acidified by adding for instance about one part of a 10 per cent solution of sulfuric acid (or the amount required for neutralization) mixed with one part of a 10 per cent solution of phosphoric acid for acidification; other mild acids as lactic and boric can be substituted for phosphoric acid, and suitable dyes and pigments are also included. The composition is further heated until the mass reaches the desired viscosity whereupon it is immediately poured into pans and cooled; during this heating step advancement or polymerization of the resin occurs. Preferably this is carried to the point where the mass when cold is sufficiently brittle so that it can be ground, and charged into a mold in the form of a powder.

The reactants, namely the phenol and the formaldehyde used in the above examples, are purified, for it has been discovered that color permanency is dependent upon pure materials.

As a basic catalyst for directing the initial resin forming reaction and union with excess formaldehyde preferably alkali earth metal compounds are selected which upon acidification precipitate water insoluble salts, and the acids are selected with this end in view. While the presence of such salts reduces transparency of the resin it does not destroy the translucency. Consequently the appearance desired in the finished denture is maintained, and at the same time the denture is improved materially in its resistance to water and mouth fluids as well as in its strength and toughness.

The material is adapted for articles shaped under pressure other than dentures wherein the properties herein described are desirable, such as for cameos, trinkets, buttons, handles. The proportions and the process steps can obviously be modified, particularly with water resistant plasticizers as dibutyl phthalate to give the degree of plasticity, toughness, etc. that may be required for such articles. In view of the virtual absence of inherent color, the material can be pigmented or dyed in any manner to give the effect desired.

This application is a continuation-in-part of the copending application Serial No. 262,321 filed March 16, 1928.

I claim:

1. A process of preparing a composition suitable for dentures which comprises causing about 6 mols of phenol to react with about 9 mols of formaldehyde in the presence of sodium carbonate under a reflux for a period of about an hour, acidifying the reaction mass with oxalic acid, adding a suitable dye or pigment to the mass, dehydrating the mass by heating until the temperature approaches 125° C., and pouring the mass on a surface for cooling.

2. Process of preparing a composition suitable for molding in the making of dentures which comprises causing a condensation reaction of a phenol with formaldehyde in the amount of 1.5 mols or more to each mol of the phenol in the presence of a basic catalyst to direct the reaction, retarding a polymerizing reaction conducive to gelation while continuing the condensation until substantially all of the formaldehyde is combined with the phenol by acidifying and dehydrating the reaction mass without removal of resinous constituents, the degree of dehydration being equivalent to that obtained by dehydrating in an open vessel to a temperature approaching 125° C. or higher, and advancing the reaction mass under acid conditions to a solid state capable of softening under the action of heat so as to be moldable and hardenable by a further application of heat.

3. Process according to claim 2 in which dehydration is effected under a vacuum.

4. Process according to claim 2 wherein the basic catalyst is a compound of an alkaline earth metal.

5. Process according to claim 2 wherein sufficient acid is added to neutralize the basic catalyst and a mild acid included to impart an acid reaction to the mass so that the reaction proceeds under weakly acid conditions.

6. Product such as obtained when prepared according to claim 2 and characterized by substantial absence of uncombined phenol or formaldehyde.

7. Process of preparing a composition suitable for hot-press molding in the making of dentures which comprises causing a condensation of a phenol with an aldehyde in the proportion of at least 1.5 mols to each mol of the phenol in the presence of a basic catalyst, continuing the reaction under a reflux for a period until a substantially complete combination of the aldehyde with the phenol is obtained, retarding polymerization conducive to gelation while continuing the condensation by neutralization of the basic catalyst and further acidification with a mild organic acid together with a dehydration of the reaction mass equivalent to that obtained by evaporating in an open vessel to a temperature approaching 125° C. or higher, and advancing the reaction mass under acid conditions to a solid state capable of softening under the action of heat so as to be moldable and hardenable by a further application of heat.

8. Composition suitable for molding in the making of dentures comprising the dehydrated reaction product of a phenol and formaldehyde prepared by a substantially complete condensation of the phenol and the formaldehyde in amount of 1.5 mols or more to each mol of the phenol under basic conditions and partial polymerization under acid conditions to an intermediate heat-hardenable plastic solid state.

9. Composition suitable for molding in the making of dentures comprising the dehydrated reaction product of a phenol with 1.5 mols or more of formaldehyde in the presence of a base and neutralized by mineral acid, said product being hardened by heating to a solid intermediate state capable of softening under the action of heat so as to be moldable and hardenable by a further application of heat.

10. Article comprising the dehydrated reaction product of a phenol and formaldehyde prepared by a substantially complete condensation of the phenol and the formaldehyde in amount of 1.5 mols or more to each mol of the phenol in the presence of a base and partial polymerization under acid conditions to a plastic solid state, molded to form with complete hardening of the resin in the mold under the application of heat, said article being characterized by substantial permanency of color, translucency, resistance to shock and freedom from absorption of fluids.

11. Composition suitable for hot-press molding in the making of dentures comprising a condensation product of a phenol and an aldehyde in the amount of at least 1.5 mols to each mol of the phenol in the presence of catalytic proportions of a base dehydrated to a degree equivalent to that obtained by evaporating under a vacuum of substantially 29 inches to a temperature approaching 50° C. and advanced under acid conditions to a solid state capable of softening under the action of heat so as to be moldable and hardenable by a further application of heat.

JOHN H. SCHMIDT.